United States Patent
Ligonesche et al.

(10) Patent No.: US 9,518,702 B2
(45) Date of Patent: *Dec. 13, 2016

(54) VALVE FOR PRESSURIZED FLUID AND TANK FURNISHED WITH SUCH A VALVE

(71) Applicant: L'Air Liquide, Société Anonyme pour l'Etude et l'Exploitation des Procédés Georges Claude, Paris (FR)

(72) Inventors: Renaud Ligonesche, Herblay (FR); Tristan Debry, Rennes (FR); Romuald De Potter, Taverny (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 78 days.

This patent is subject to a terminal disclaimer.

(21) Appl. No.: 14/604,838

(22) Filed: Jan. 26, 2015

(65) Prior Publication Data

US 2015/0144210 A1     May 28, 2015

Related U.S. Application Data

(63) Continuation of application No. 13/347,810, filed on Jan. 11, 2012, now Pat. No. 8,939,170.

(30) Foreign Application Priority Data

Jan. 11, 2011  (FR) ...................... 11 50227

(51) Int. Cl.
*F16K 31/60* (2006.01)
*F17C 13/04* (2006.01)

(52) U.S. Cl.
CPC ............. *F17C 13/04* (2013.01); *F16K 31/602* (2013.01); *F17C 2205/0329* (2013.01);
(Continued)

(58) Field of Classification Search
CPC ................ F17C 13/04; F17C 2250/043; F17C 2205/0394; F17C 2205/0338; F17C 2205/0329; F16K 31/602; Y10T 16/44; Y10T 137/8326; Y10T 137/8158
(Continued)

(56) References Cited

U.S. PATENT DOCUMENTS

| 1,413,504 A | 4/1922 | Strickland |
| 2,008,657 A | 7/1935 | Deiller |

(Continued)

FOREIGN PATENT DOCUMENTS

| EP | 0 747 796 | 12/1996 |
| EP | 1 421 305 | 3/2003 |

(Continued)

OTHER PUBLICATIONS

European Search Report and Written Opinion for corresponding EP 14199362, Mar. 19, 2015.

(Continued)

*Primary Examiner* — John Bastianelli
(74) *Attorney, Agent, or Firm* — Elwood L. Haynes

(57) ABSTRACT

A valve for pressurized fluid, with or without incorporated pressure-reducing valve, comprising a body accommodating a fluid circuit having an upstream end and a downstream end, the circuit comprising an isolation valve element in order to selectively close off the circuit, the valve element being controlled by a lever mounted so as to pivot on the body between a rest position in which the isolation valve element is held in a position of closing the circuit and an active position in which the lever moves the isolation valve element into a position of opening the circuit, the lever provides protection for a functional member mounted on the body of the valve, there is no mechanical collision between the opening and the measuring member, and wherein no (Continued)

portion of the measuring member is within the volume of the lever.

14 Claims, 1 Drawing Sheet

(52) U.S. Cl.
CPC ............... *F17C 2205/0338* (2013.01); *F17C 2205/0394* (2013.01); *F17C 2250/043* (2013.01); *Y10T 16/44* (2015.01); *Y10T 137/8158* (2015.04); *Y10T 137/8326* (2015.04)

(58) Field of Classification Search
USPC .......................... 251/231–257; 137/551, 557
See application file for complete search history.

(56) References Cited

U.S. PATENT DOCUMENTS

| | | | |
|---|---|---|---|
| 2,109,896 A | 10/1936 | Anderson et al. | |
| 2,064,794 A * | 12/1936 | Klauminzer | B05B 1/308 251/245 |
| 2,360,603 A | 6/1941 | Ward | |
| 2,399,147 A | 3/1944 | Schweisthal | |
| 2,643,678 A | 6/1953 | Paradise | |
| 2,644,486 A | 7/1953 | Christensen | |
| 2,681,707 A | 6/1954 | Mapes | |
| 2,702,657 A | 2/1955 | Davis | |
| 2,732,171 A | 1/1956 | Paradise | |
| 2,918,976 A | 10/1957 | Peterson | |
| 3,031,165 A | 4/1962 | Allen | |
| 3,032,605 A | 5/1962 | Ninnelt | |
| 3,066,838 A * | 12/1962 | Hansen | B65D 83/201 251/231 |
| 3,109,625 A * | 11/1963 | Steiman | B65D 83/48 251/353 |
| 4,254,667 A | 3/1981 | Wong | |
| 5,246,202 A * | 9/1993 | Beamer | B60H 1/00328 251/297 |
| 5,788,840 A | 8/1998 | Lee et al. | |
| 5,975,121 A | 11/1999 | Arzenton et al. | |
| 6,886,587 B2 * | 5/2005 | Fancher | F16K 27/003 137/315.01 |
| 7,703,821 B2 * | 4/2010 | Swain | F17C 13/002 220/724 |
| 8,056,580 B2 * | 11/2011 | Lang | F16K 1/306 251/263 |
| 2003/0217774 A1 | 11/2003 | Markham et al. | |
| 2004/0164098 A1 | 8/2004 | Zheng | |
| 2004/0231729 A1 | 11/2004 | Lang et al. | |
| 2005/0173007 A1 | 8/2005 | Cannet et al. | |
| 2008/0110925 A1 * | 5/2008 | Hagstrom | A61M 16/10 222/3 |
| 2009/0050218 A1 * | 2/2009 | Burgess | F17C 13/06 137/557 |

FOREIGN PATENT DOCUMENTS

| | | |
|---|---|---|
| FR | 2 793 297 | 5/1999 |
| FR | 2 802 281 | 6/2001 |
| FR | 2 840 664 | 12/2003 |
| FR | 2 865 263 | 7/2005 |
| GB | 515 614 | 12/1939 |
| GB | 2 268 573 | 1/1994 |

OTHER PUBLICATIONS

European Search Report and Written Opinion for corresponding EP 15155967, Apr. 24, 2015.
French Search Report and Written Opinion for FR 11 50227, Sep. 19, 2011.

* cited by examiner

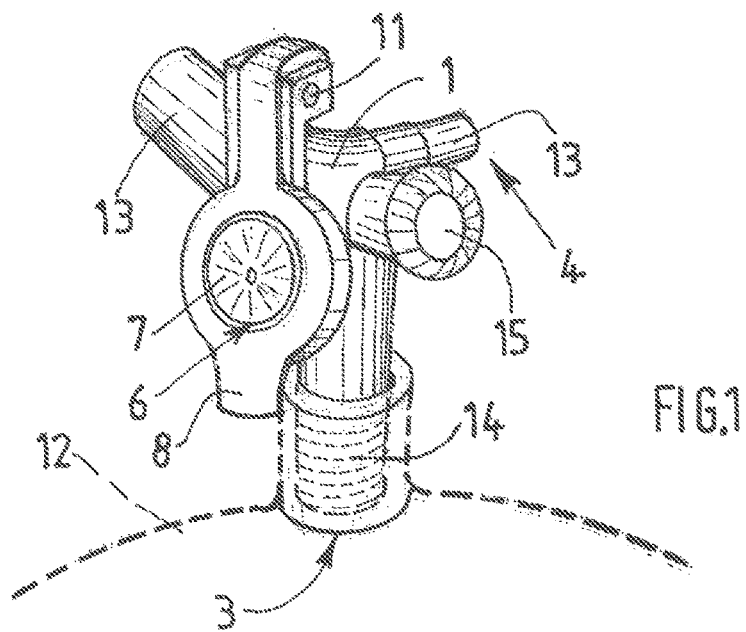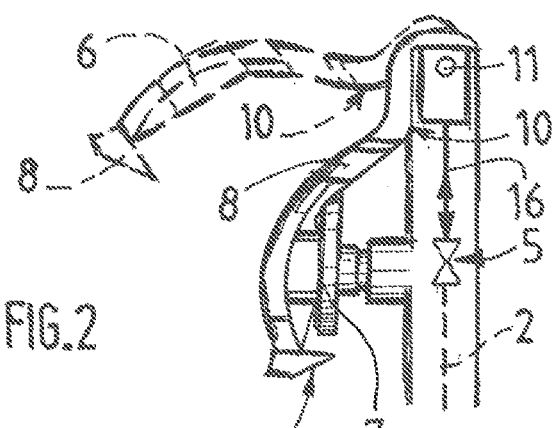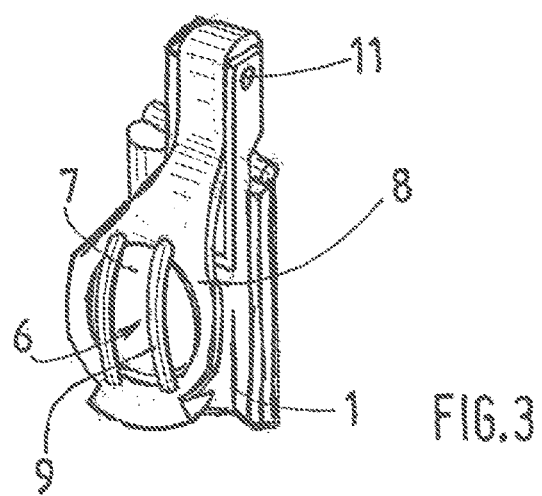

VALVE FOR PRESSURIZED FLUID AND TANK FURNISHED WITH SUCH A VALVE

CROSS REFERENCE

This application is a continuation of U.S. patent application Ser. No. 13/347,810 filed Jan. 11, 2012 which claims the benefit of priority under 35 U.S.C. §119 (a) and (b) to French Application No. 11 50227, filed Jan. 11, 2011, the entire contents of which are incorporated herein by reference.

BACKGROUND

The present invention relates to a valve for pressurized fluid and a tank furnished with such a valve.

The invention relates more particularly to a valve for pressurized fluid, with or without incorporated pressure-reducing valve, comprising a body accommodating a fluid circuit having an upstream end designed to be placed in communication with a reserve of pressurized fluid and a downstream end designed to be placed in communication with a using device, the circuit comprising an isolation valve element in order to selectively close off the circuit, the valve element being controlled by a lever mounted so as to pivot on the body between a rest position in which the isolation valve element is held in a position of closing the circuit and an active position in which the lever moves the isolation valve element into a position of opening the circuit.

The invention relates in particular to valves for pressurized fluid, notably for pressurized gas, comprising a manual control member of the pivoting lever type.

Non-limiting examples of such valves are described in documents EP 747796 or EP 1421305.

Inventors are constantly attempting to improve the technical solutions for the users of valves for pressurized fluid.

In particular, it is desirable to have valves for pressurized fluid that maintain or increase the number of functions without increasing the volume or their bulk (and preferably while reducing their bulk or their volume). Specifically, ideally the valves should be able to be adapted to sizes and shape of different protective caps.

Moreover, it is always desirable to increase the sturdiness and/or the safety of such devices.

SUMMARY

One object of the present invention is to at least partly improve some of the features of valves for pressurized fluid.

For this purpose, the valve according to the invention, moreover according to the generic definition given thereto by the above preamble, is essentially characterized in that the lever comprises at least one opening and in that, when the lever is in at least one of the positions including the active position, the rest position or an intermediate position between these two positions, the opening accommodates within it a portion of the body of the valve and/or a portion of a functional member mounted on the body of the valve.

Therefore the invention makes it possible to improve the compactness of the valve and, if necessary, provides additional protection for the valve.

According to other possible particular features:

- the valve comprises a member for measuring a physical magnitude of the fluid in the circuit, the measuring member comprising a display, the opening of the lever having a shape that matches the display of the measuring member, when the lever is in its rest position, at least a portion of the display of the measuring member is housed in the opening of the lever, that is to say that the display is at least partially surrounded by the body of the lever and is incorporated into the volume of the lever,
- the valve comprises a member for measuring a physical magnitude of the fluid in the circuit, the measuring member comprising a display, the opening of the lever having a shape that matches the display of the measuring member, when the lever is in its active position or an intermediate position between the active position and the rest position, at least one portion of the display of the measuring member is housed in the opening of the lever, that is to say that the display is at least partially surrounded by the body of the lever and is incorporated into the volume of the lever,
- the measuring member is a manometer indicating a pressure or a content,
- the lever comprises one or more reinforcements forming cross members between two ends of the opening,
- when the lever is in at least one of the active or rest positions, at least one portion, called the "bearing" portion of the lever, interacts in abutment with the body of the valve so as to limit the movement of the lever,
- one end of the lever is articulated on the body and at least one bearing portion of the lever is situated close to the axis of articulation of the lever,
- at least one bearing portion of the lever is situated close to the end of the lever that is opposite to the axis of articulation,
- the opening is circular, oval, square, rectangular or parallelepipedal and is situated close to one end of the lever,
- the lever is made of a plastic and/or of moulded metal,
- the lever is made of a pressed metal.

The invention also relates to a tank for pressurized fluid comprising a valve according to any one of the features above or below.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

Other particular features and advantages will appear on reading the following description made with reference to the figures in which:

FIG. 1 represents a schematic and partial view in perspective illustrating a possible example of a valve for pressurized gas according to the invention mounted on the neck of a bottle of pressurized fluid, FIG. 2 represents a schematic view from the side of a detail of FIG. 1 illustrating the structure and the operation of a pivoting lever for actuating a valve element, FIG. 3 represents a view in perspective of a detail of another possible embodiment of a valve lever according to the invention.

DESCRIPTION OF PREFERRED EMBODIMENTS

The valve that is illustrated as a non-limiting example in FIG. 1 comprises a body 1 comprising a threaded base 14 mounted in the aperture of a tank 12 of pressurized gas. The body 1 accommodates a circuit 2 for withdrawing fluid that has an upstream end 3 designed to be placed in communication with the storage volume of a tank 12 of pressurized fluid and a downstream end 4 designed to be placed in communication with a using device.

The downstream end 4 of the circuit 2 may lead into an outlet connector 13 designed to be connected to a hose and/or a device for using the gas supplied by the valve. The valve may if necessary comprise a distinct filling connector 13 furnished with a valve element (not shown) making it possible to inject gas into the tank 12 via a circuit inside the valve (distinct or partly common to the circuit 2 for withdrawing).

Conventionally, the circuit 2 for withdrawing may comprise control members such as a pressure-reducing valve, a residual pressure valve element, etc.

The circuit 2 for withdrawing comprises in particular an isolation valve element 5 (see FIG. 2 schematically) making it possible to selectively stop the passage of the gas. If the valve incorporates a pressure-reducing valve, the valve element 5 may be placed upstream or downstream of the pressure-reducing valve.

The valve also comprises a manometer 7 measuring the pressure in the circuit 2 for drawing off, for example upstream of the valve element 5.

The valve may also comprise a thumbwheel 15 for manually controlling the flow rate and/or the pressure delivered by the valve.

The valve element 5 is controlled by a lever 8 mounted so as to pivot on the body 1 of the valve between a rest position in which the isolation valve element 5 is held in a position of closing the circuit 2 (solid lines in FIGS. 1 and 2) and an active position in which the lever 8 moves the isolation valve element 5 into a position of opening the circuit 2 (see dashed lines in FIG. 2).

For example, the rotation of the lever 8 selectively actuates a valve-element driving member 16.

For example, in its rest position, the lever 8 is positioned against or alongside the body of the valve 1, preferably in a stable position.

In its active (preferably stable) position, the lever 8 is for example offset by a non-zero angle relative to the rest position.

In this non-limiting example, the lever 8 is articulated (axis 11) at one of its ends and, in the rest position, the free end of the lever 8 is oriented towards the base 14 of the valve. Naturally, this configuration is in no way limiting. For example, it is possible to envisage a rest position with the lever 8 oriented away from the base (upwards), or in any direction (sideways) and any angle that is determined to be appropriate. The same applies for the active position which may be defined in any other orientation and angle relative to the body 1.

According to one advantageous particular feature, the lever 8 comprises at least one opening 6 and, when the lever 8 is in its rest position, the opening 6 accommodates within it at least one portion of the manometer 7.

That is to say that the manometer 7 (at least a portion of its display) is included in the volume of the lever 8.

This configuration makes it possible to increase the compactness of the assembly. Moreover, the lever 8 thus provides additional protection for the manometer 7 but also for the user of the valve. In position around the manometer 7, the lever 8 forms an additional protective frame for the manometer 7 protecting it from direct or indirect impacts without requiring additional parts. Moreover, this frame formed by the lever 8 also forms an encirclement for retaining the manometer in the event of failure of the latter (in the event for example of the risk of the manometer 7 being ejected when subjected to high pressure).

This makes it possible to increase the reliability and service life of the assembly.

Naturally, the invention is not limited to this exemplary embodiment.

Thus, it is possible to envisage an alternative or cumulative configuration in which, when the lever 8 is in its active position, the opening 6 accommodates within it another portion of the body 1 of the valve and/or a functional member mounted on the body 1 of the valve.

Similarly, alternatively or cumulatively, it is possible to envisage a configuration in which, during an intermediate position of the lever 8 (when it is moved between its rest and active positions), the opening 6 passes around at least a portion of the body 1 of the valve and/or of a functional member mounted on the body 1 of the valve.

This makes it possible to increase the compactness of the assembly.

In the example described, the opening 6 is circular and matches the circular shape of the manometer 7. Naturally, the shape and/or the orientation of the opening 6 may be different and complementary to any other shape of any other member of the valve (flowmeter, selecting member with float, temperature sensor, etc.).

Similarly, the opening 6 may be made by a cut-out and/or one or more bends or curvatures of the lever 8.

Thus the opening 6 may be delimited by a closed contour as illustrated in the figures. Naturally, as a variant the opening 6 may be delimited by an open contour, that is to say for example by a curving of material that does not close on itself (for example like the loop of a question mark).

As shown in FIG. 2, when the lever 8 is in its rest position, at least one portion 10, called the "bearing" portion of the lever 8, interacts in abutment with the body 1 of the valve in order to limit the movement of the lever 8 towards the body 1.

The bearing portion 10 of the lever 8 is for example situated close to the axis 11 of articulation of the lever 6. Naturally, a similar bearing portion could be provided at the free end of the lever or in its middle portion. This makes it possible to further reinforce the strength of the assembly because the bearing element may, if necessary, limit the deformation of the lever 8 in the event of greater impacts.

In the variant of FIG. 3, the lever 8 comprises one or more reinforcements 9 forming cross members between two ends of the opening 6. These reinforcements 9 form an additional protection (impacts, ejections) for the manometer 7 without affecting the uninterrupted reading of the dial of the manometer 7 too much.

As shown in FIG. 2, the free end 116 of the lever 8 may comprise a narrowed shape limiting the risks of possibly catching the finger of a user during handling.

Preferably, when the opening 6 of the valve accommodates within it a portion of the body of the valve and/or a portion of a functional member, there is no mechanical collision between the opening 6 and the portion that is accommodated.

It can therefore easily be understood that, while having a simple and low-cost structure, the structure that is the subject of the invention makes it possible to improve the compactness and, where necessary, the sturdiness of the valve.

The invention may also relate to any alternative device or method comprising any combination of the above features.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A valve for pressurized fluid, with or without incorporated pressure-reducing valve, comprising a body comprising a fluid circuit having an upstream end designed to be placed in communication with a reserve of pressurized fluid and a downstream end designed to be placed in communication with a pressurized fluid using device, the circuit comprising an isolation valve element configured to selectively close off the circuit, the isolation valve element being configured to be controlled by a lever, wherein the lever is mounted so as to be capable of pivoting on the body between a rest position in which the isolation valve element is configured to close the fluid circuit and an active position in which the isolation valve element is configured to open the fluid circuit, wherein the lever comprises at least one opening and in that, when the lever is configured in at least one of the active position, the rest position, or an intermediate position between these two positions, the lever provides protection for a functional member mounted on the body of the valve, wherein the functional member comprises a measuring member adapted to measure a physical magnitude of the fluid in the circuit, the measuring member comprising a display, the opening of the lever having a shape that matches the display of the measuring member, and wherein when the lever is configured in a position selected from the group consisting of the rest position, the active position, and an intermediate position, at least a portion of the display of the measuring member is positioned through the opening of the lever, and the display is at least partially surrounded by the body of the lever and incorporated into a volume of the lever.

2. The valve of claim 1, wherein the measuring member is a manometer indicating a pressure or a content.

3. The valve of claim 1, wherein the lever comprises one or more reinforcements forming cross members between two ends of the opening.

4. The valve of claim 1, wherein, when the lever is configured in at least one of the active or rest positions, at least one bearing portion of the lever, interacts in abutment with the body of the valve adapted to limit the movement of the lever.

5. The valve of claim 1, wherein one end of the lever is articulated on the body and wherein at least one bearing portion of the lever is situated close to the axis of articulation of the lever.

6. The valve of claim 1, wherein at least one bearing portion of the lever is situated close to a second end of the lever that is opposite to where one end of the lever is articulated on the body.

7. The valve of claim 1, wherein the opening is circular, oval, square, rectangular or parallelepipedal and is situated close to one end of the lever.

8. The valve of claim 1, wherein the lever is made of a plastic and/or of molded metal.

9. The valve of claim 1, wherein the lever is made of a pressed metal.

10. The valve of claim 1, wherein the opening of the lever is delimited by a closed contour.

11. The valve of claim 1, wherein the opening of the lever is delimited by an open contour.

12. A tank of pressurized fluid comprising the valve of claim 1.

13. The valve of claim 1, wherein there is no mechanical collision between the opening and the measuring member.

14. The valve of claim 1, wherein no portion of the measuring member is within the volume of the lever.

* * * * *